US006950638B2

(12) United States Patent
Videtich et al.

(10) Patent No.: US 6,950,638 B2
(45) Date of Patent: Sep. 27, 2005

(54) METHOD AND SYSTEM FOR SCHEDULING USER PREFERENCE SATELLITE RADIO STATION SELECTIONS IN A MOBILE VEHICLE

(75) Inventors: Matt C. Videtich, Farmington Hills, MI (US); Thomas P. Grau, Rochester Hills, MI (US); Richard M. Lee, Bloomfield Village, MI (US)

(73) Assignee: General Motors Corporation, Detroit, MI (US)

( * ) Notice: Subject to any disclaimer, the term of this patent is extended or adjusted under 35 U.S.C. 154(b) by 398 days.

(21) Appl. No.: 10/135,276

(22) Filed: Apr. 30, 2002

(65) Prior Publication Data

US 2003/0203714 A1 Oct. 30, 2003

(51) Int. Cl.[7] .................................................. H04B 1/18

(52) U.S. Cl. ................................ 455/186.1; 455/161.1; 455/161.2; 455/161.3

(58) Field of Search ........................... 455/186.1, 161.2, 455/161.1, 161.3, 179.1, 418, 419, 420

(56) References Cited

U.S. PATENT DOCUMENTS 6,282,412 B1 * 8/2001 Lyons ..................... 455/186.1

2004/0116088 A1 * 6/2004 Ellis et al. .................. 455/132

* cited by examiner

*Primary Examiner*—Sonny Trinh
*Assistant Examiner*—Phuoc Doan
(74) *Attorney, Agent, or Firm*—Anthony Luke Simon

(57) ABSTRACT

A system and method is directed to scheduling user preference satellite radio station selections in a mobile vehicle. The method provides creating at least one vehicle preference selection schedule utilizing a user interface, transferring the vehicle preference selection schedule into a mobile communication unit, monitoring a satellite radio system broadcast, requesting the vehicle preference selection schedule from the mobile communication unit, and extracting a radio station selection from the broadcast based on the vehicle preference selection schedule. The system further provides a means for creating a vehicle preference selection schedule utilizing a user interface, a means for transferring the vehicle preference selection schedule into a mobile communication unit, a means for monitoring a satellite radio system broadcast, a means for requesting the vehicle preference selection list from the mobile communication unit, and a means for extracting a selection from the broadcast based on the vehicle preference selection schedule.

20 Claims, 4 Drawing Sheets

FIG. 2a
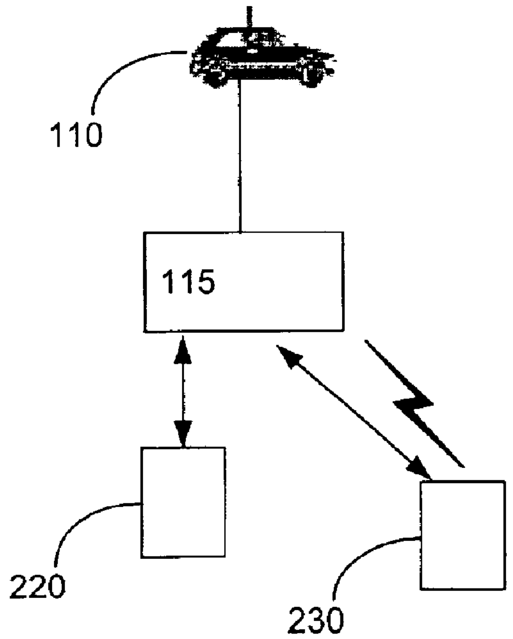
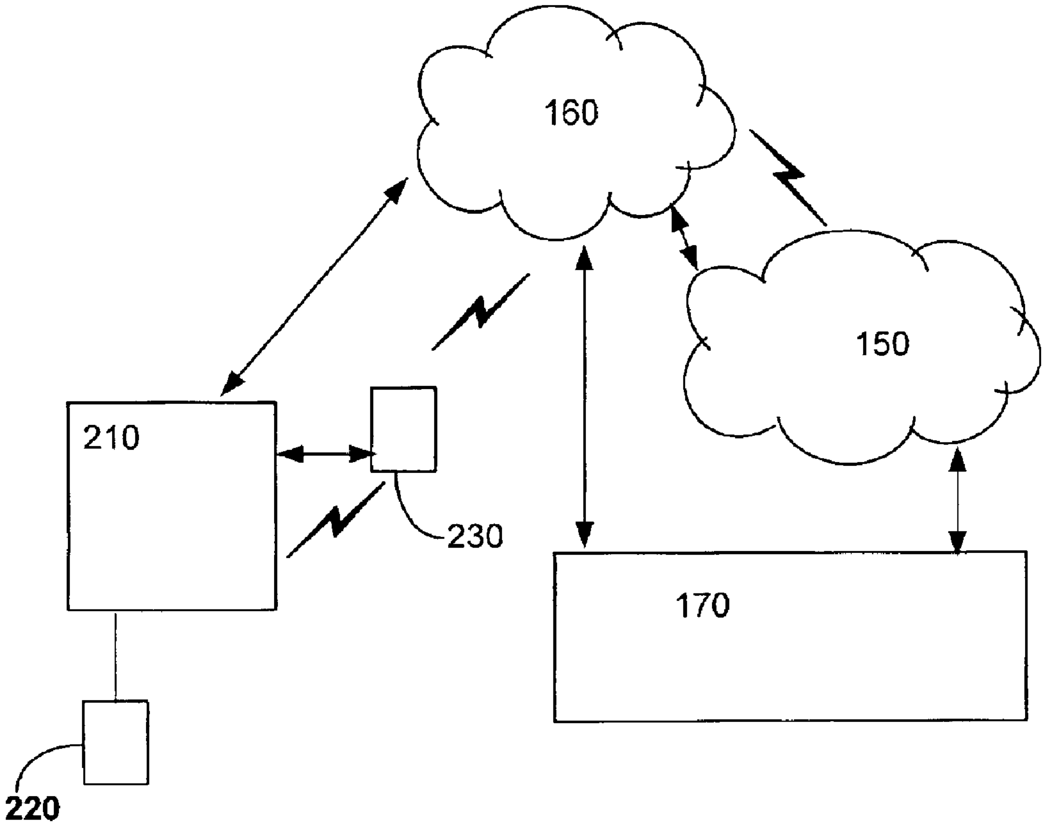
FIG. 2

METHOD AND SYSTEM FOR SCHEDULING USER PREFERENCE SATELLITE RADIO STATION SELECTIONS IN A MOBILE VEHICLE

FIELD OF THE INVENTION

In general, the invention relates to data transmission over a wireless communication system. More specifically, the invention relates to a method and system for scheduling user preference satellite radio station selections in a mobile vehicle.

BACKGROUND OF THE INVENTION

Mobile communication units (MCU's), such as cellular phones, personal data assistants (PDA's), Global Positioning System (GPS) devices, and on-board Vehicle Communication Units (VCU's), used in conjunction with a Wide Area Network (WAN), such as a cellular telephone network or a satellite communication system, have made it possible for a person to send and receive voice communications, data transmissions, and FAX messages from virtually anywhere on earth. Such communication is initiated at the MCU when it is turned on, or by entering a phone number to be called, or in many cases, by pressing a preprogrammed button on the MCU or speaking a voice command causing the MCU to automatically complete the process of dialing the number to be called. A radio communication link is established between the MCU and a Wide Area Network (WAN), using a node of the WAN in the vicinity of the MCU.

In cellular telephone systems, a node is commonly referred to as a "cellular base station." Once the radio communication link between the MCU and the cellular base station has been established, the base station then utilizes a combination of additional cellular stations, conventional telephone wire line networks, and possibly even satellite systems to connect the MCU to the number to be called.

Wireless communication services for MCU users, such as navigation and roadside assistance, have increased rapidly in recent years. Most of the services that have been offered are for a motor vehicle in operation, and include services that may require location and destination information. Such services are provided at a cost to the MCU users, and also at a cost to the MCU service provider. MCU service providers must make available a wireless communication service customer assistance center (or other such manually staffed service center) in order that an operator or customer assistant may complete the MCU requests. It would be beneficial to the MCU user and service provider to offer information and services advantageous to the MCU user, yet profitable to the MCU provider without MCU user subsidies. In addition, limited MCU equipped vehicle information is currently requested or used for the immediate advantage of the MCU user.

Recently, additional services have been offered for entertainment purposes, such as satellite radio, terrestrial digital radio, and other wireless communication systems to motor vehicles. Many of these broadcasts may be delivered with additional data such as station identification, song titles, and program schedules. Such services are also provided at a cost to the user and will provide an additional revenue stream if enhancements can be linked to an MCU system. MCU service providers may utilize the already available WAN to provide such enhancements.

It would be desirable, therefore, to provide a method and system that would overcome these and other disadvantages.

SUMMARY OF THE INVENTION

The present invention is directed to a system and method for scheduling user preference satellite radio selections in a mobile vehicle. The invention allows a user to establish a vehicle preference selection schedule utilizing a user interface, download the vehicle preference selection schedule into a vehicle mounted satellite radio receiver, and have the option of listening to either the vehicle preference selection schedule or a user determined station.

One aspect of the invention provides a method for scheduling user preference satellite radio selections in a mobile vehicle by creating at least one vehicle preference selection schedule utilizing a user interface, transferring the vehicle preference selection schedule into a mobile communication unit, monitoring a satellite radio system broadcast, requesting the vehicle preference selection schedule from the mobile communication unit, and extracting a radio station selection from the broadcast based on the vehicle preference selection schedule. The invention further provides for extracting the selection by comparing user personalized program selection time indices in the vehicle preference selection schedule to a current time index, and selecting the radio station selection linked to a time index that matches the current time index.

In accordance with another aspect of the invention, a system for vehicle preference selection monitoring is provided. The system includes a means for creating a vehicle preference selection schedule utilizing a user interface. The system further includes means for transferring the vehicle preference selection schedule into a mobile communication unit. Means for monitoring a satellite radio system broadcast, means for requesting the vehicle preference selection schedule from the mobile communication unit and means for extracting a selection from the broadcast based on the vehicle preference selection schedule are also provided.

In accordance with yet another aspect of the invention, a computer readable medium storing a computer program includes: computer readable code for creating a vehicle preference selection schedule utilizing a user interface, computer readable code for transferring the vehicle preference selection schedule into a mobile communication unit, computer readable code for monitoring a satellite radio system broadcast, computer readable code for requesting the vehicle preference selection list from the mobile communication unit, and computer readable code for extracting a selection from the broadcast based on the vehicle preference selection list.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

FIG. 2 is a block diagram illustrating an embodiment of the present invention;

FIG. 2*a* is a block diagram illustrating another embodiment of the present invention;

DETAILED DESCRIPTION OF THE PRESENTLY PREFERRED EMBODIMENT

Throughout the specification, and in the claims, the term "connected" means a direct electrical connection between the things that are connected, without any intermediate devices. The term "coupled" means either a direct electrical connection between the things that are connected, or an indirect connection through one or more passive or active intermediary devices.

The present invention relates to data transmission over a wireless communication system and more particularly to scheduling user preference satellite radio selections in a mobile vehicle. The present invention allows a user to establish a vehicle preference selection schedule utilizing a user interface, download the vehicle preference selection schedule into a vehicle mounted satellite radio receiver, and have the option of listening to either the vehicle preference selection schedule or a user defined radio station preference setting.

Illustrative Operating Environment

Figure 1:
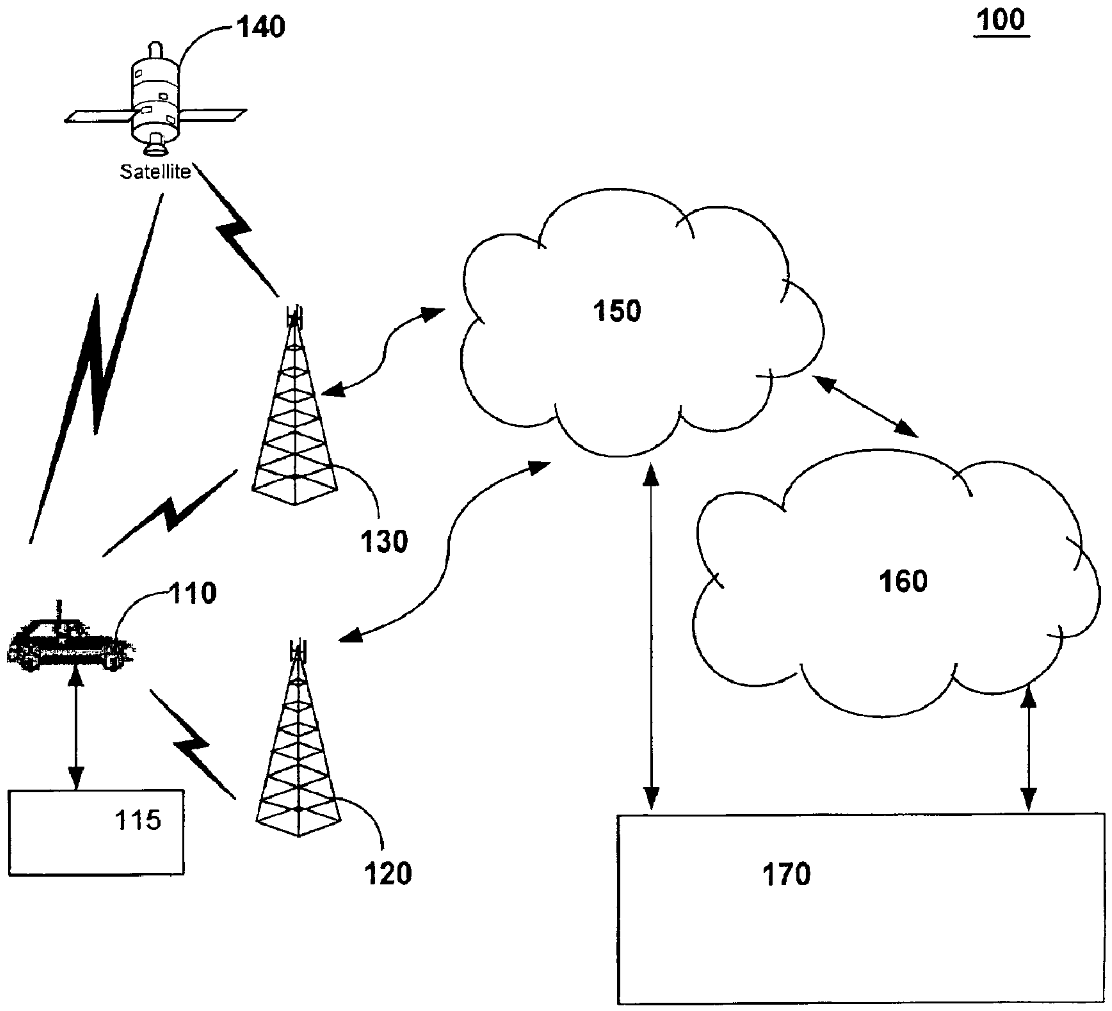
FIG. 1 is a block diagram illustrating an operating environment according to an embodiment of the present invention.

FIG. 1 is a block diagram illustrating an example of an operating environment that is in accordance with the present invention. FIG. 1 details an embodiment of a system for operating a satellite radio subscription service in a mobile vehicle, in accordance with the present invention, and may be referred to as a mobile vehicle communication system (MVCS) 100. The mobile vehicle communication system (MCVS) 100 may include one or more mobile vehicle communication units (MVCU) 110, one or more audio devices 115, one or more wireless communication systems 120, one or more radio carrier systems 130, one or more satellite broadcast systems 140, one or more communication networks 150, one or more land networks 160, and one or more service providers 170.

In one example, MVCU 100 may be implemented as an OnStar system, as is known in the art, with regards to wireless communications, and as an XM Satellite Radio system, as is known in the art, with regards to satellite radio and terrestrial digital radio communications.

MCVU 110 may contain a wireless vehicle communication device (module, MVCS module) such as an analog or digital phone with suitable hardware and software for transmitting and receiving data communications. MCVU 110 may contain a wireless modem for transmitting and receiving data. MCVU 110 may contain a digital signal processor with software and additional hardware to enable communications with the mobile vehicle and to perform other routines and requested services. MCVU 110 may contain a global positioning system (GPS) unit capable of determining synchronized time and a geophysical location of the mobile vehicle. MCVU 110 may send to and receive radio transmissions from wireless communication system 120.

Audio device 115 may include any suitable hardware for receiving broadcast signals in MCVU 110. Audio device 115 includes a receiver and may receive broadcasts from wireless communication system 120, radio broadcast system 130, and satellite broadcast system 140. Audio device 115 may also include a device for maintaining or receiving current time information and may be referred to as a current time index (CTI).

Audio device 115 may further include an audio speaker, a synthesized voice output, an audio channel, or the like. Audio device 115 may be implemented, in addition to the receiver, as a set of headphones, the audio portion of a television, a display device, or the like.

MCVU 110 may also contain a speech recognition system (ASR) module capable of communicating with audio device 115. The module may additionally be capable of functioning as any part or all of the above communication devices and, for one embodiment of the invention, may be capable of data storage, and/or data retrieval, and/or receiving, processing, and transmitting data queries. In one example, audio device 115 includes a speech recognition system (ASR) module.

Wireless communications system 120 may be a wireless communications carrier or a mobile telephone system and may transmit to and receive signals from one or more MCVU 110. Wireless communication system 120 may incorporate any type of telecommunications in which electromagnetic waves carry signal over part or the entire communication path. More specific to the present invention, wireless communication system 120 may be any type of broadcast communication in addition to those of radio broadcast system 130 and satellite broadcast system 140. Wireless communications system 120 may be implemented as a single unit in conjunction with radio broadcast system 130, it may be implemented as coupled with radio broadcast system 130, or in some such other configuration as would allow the systems to function as described.

In one example, such wireless communication carrier is a short message service, modeled after established protocols such as IS-637 SMS standards, IS-136 air interface standards for SMS, and GSM 03.40 and 09.02 standards. Similar to paging, an SMS communication could be broadcast to a number of regional recipients.

In another example, the mobile telephone system may be an analog mobile telephone system operating over a prescribed band nominally at 800 MHz. The mobile telephone system may be a digital mobile telephone system operating over a prescribed band nominally at 800 MHz, 900 MHz, 1900 MHz, or any suitable band capable of carrying mobile communications.

Radio broadcast system 130 may transmit radio signals with data to audio device 115 in MCVU 110. Radio broadcast system 130 may transmit analog audio and/or video signals, such as those sent from AM and FM radio stations and transmitters, or digital audio signals in the S band (approved for use in the U.S.) and L band (used in Europe and Canada). Audio device 115 may store or retrieve data and information from the audio and/or video signals of radio broadcast system 130. In an example, audio device 115 retrieves terrestrial digital radio signals from a signal received from radio broadcast system 130.

Satellite broadcast system 140 may transmit radio signals to audio device 115 in MCVU 110. In one embodiment, satellite broadcast system 140 may broadcast over a spectrum in the "S" band (2.3 GHz) that has been allocated by the U.S. Federal Communications Commission (FCC) for nationwide broadcasting of satellite-based Digital Audio Radio Service (DARS). In one example, satellite broadcast system 140 may be implemented as XM Satellite Radio.

Broadcast services provided by radio broadcast system 130 and satellite broadcast system 140 may be received by audio device 115 in MCVU 110. Broadcast services may include various different formatted programs based on a package subscription obtained by the user and managed by the audio device 115. Formatted programs may include such formats as "Talk," various music genres, targeted regional information, and the like. Each program contains, in addition to audio data for the program, additional information indicating at what time the program will be broadcast, the duration of the broadcast, the broadcast channel, and the like.

Communications network 150 may be implemented as any suitable system or collection of systems for connecting wireless communications system 120 to at least one MCVU 110 or to a service provider 170. Communications network 150 may include a mobile switching center and may provide services from one or more wireless communications companies.

Land network 160 may connect communications network 150 to service provider 170. Land network 160 may be implemented as a public-switched telephone network, a wired network, an optical network, a fiber network, another wireless network, or any combination thereof. Land network 160 may comprise an Internet protocol (IP) network. In one embodiment, an MCVU 160 may utilize all or part of the wireless communications system 120, communications network 150, and land network 160.

Land network 160 may connect one or more communications systems 120 to one another. Communication network 150 and land network 160 may connect wireless communications system 120 to a communication node or service provider 170.

Service provider 170 may be implemented as one or more locations where communications may be received or originate to facilitate functioning of the mobile vehicle communication system (MCVS) 100. Service provider 170 may contain any of the previously described functions.

In one embodiment, service provider 170 may be implemented as a call center, as known in the art. In an example, the call center may be implemented to service a satellite radio system. In yet another example, the call center may be implemented to service one or more of the above examples, or other services.

In operation, a service provider 170 may utilize one or more portions of the aforementioned communications network to communicate subscriber requested programming to audio device 115. The subscriber requested programming may then be accessed to by audio device 115 utilizing one or more radio broadcast system 130 and satellite broadcast system 140 segments.

FIGS. 2 and 2*a* are block diagrams illustrating an embodiment of the present invention. FIGS. 2 and 2*a* detail an embodiment of a system for scheduling and receiving user preference satellite radio selections in a mobile vehicle, in accordance with the present invention, and may be referred to as a user preference satellite reception system (UPSRS). Like components from FIG. 1 and FIGS. 2 and 2*a* are labeled identically.

In one example, UPSRS may be implemented as part of a telematics system, as is known in the art, with regards to wireless communications, and as part of a satellite radio system, as is known in the art, with regards to satellite radio and terrestrial digital radio communications.

The user preference satellite reception system (UPSRS) may further include one or more user interfaces 210. User interfaces 210 may be implemented to allow a user to communicate with service provider 170 via one or more communication networks 150 and/or land networks 160. In one embodiment, user interfaces 210 may include an ability to send as well as receive and store information. In one example, user interfaces 210 may be implemented as a personal computer or other device allowing communication with service provider 170.

In one embodiment, user interface 210 provides the user access to the service provider 170 where, among other options, the user may compile a schedule of station selections from a subscription service. In an example, the subscription service may be implemented as an XM Satellite Radio subscription service.

In another embodiment, one or more personal data assistants 230 may be utilized to access service provider 170. In an example, personal data assistant 230 may access service provider 170 indirectly via interfacing with user interfaces 210.

In another example, personal data assistant 230 may access service provider 170 directly via wireless communication utilizing one or more communication networks 150 and/or land networks 160. Examples of such wireless personal data assistants 230 include the Palm Pilot, RIM Blackberry, and the like.

In one embodiment, personal data assistant 230 may allow storage of data received from service provider 170. In another embodiment, personal data assistant 230 may allow data transfer to audio device 115.

In yet another embodiment, information received by user interfaces 210 from service provider 170 is stored in a mobile memory device 220 for later transfer to audio device 115. In one example, mobile memory device 220 may be implemented as one or more keychain memory devices. Examples of such keychain memory devices include DiskOnKey from M-Systems, ThumbDrive from Trek2000, and the like.

In one embodiment, mobile memory device 220 may allow storage of data received from service provider 170. In another embodiment, mobile memory device 220 may allow data transfer to audio device 115.

Exemplary List Creation

Figure 3:
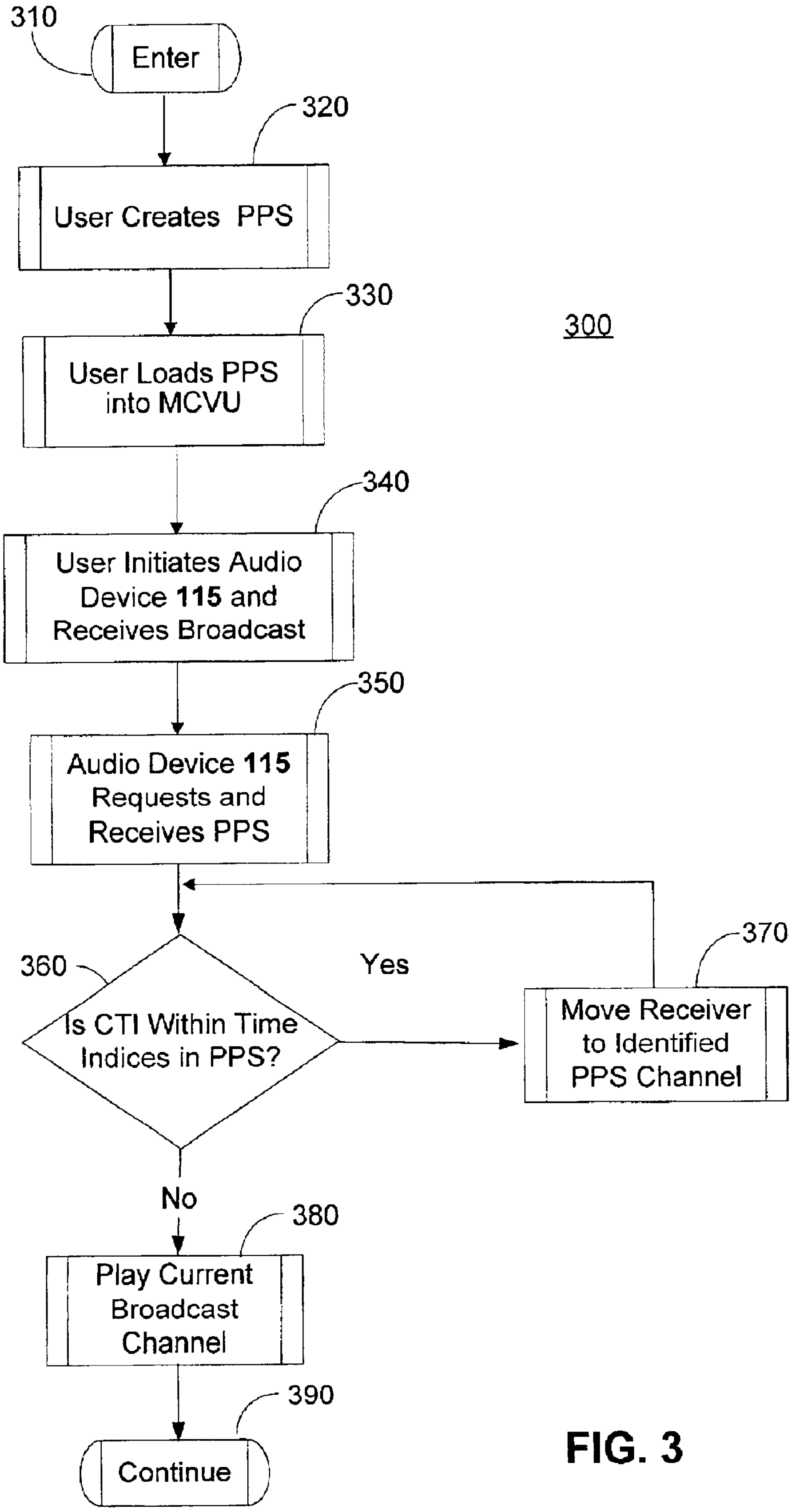
FIG. 3 is a block diagram depicting an exemplary embodiment of code on a computer readable medium in accordance with the present invention.

FIG. 3 is a block diagram depicting an exemplary embodiment of code on a computer readable medium in accordance with the present invention. FIG. 3 details an embodiment of a method 300 for scheduling and receiving user preference satellite radio selections in a mobile vehicle, in accordance with the present invention. Method 300 may utilize one or more systems detailed in FIG. 1 and FIGS. 2 and 2*a* above.

Method 300 begins at block 310 where a user may determine a need to create and utilize a personal programming schedule (PPS). In one embodiment, the PPS may be implemented in a user preference satellite reception system (UPSRS) and referenced as a vehicle preference selection schedule (VPSS). Method 300 then advances to block 320.

At block 320, the user creates the personal programming schedule (PPS). In one embodiment, the PPS may be created from a listing of available programs utilizing one or more criteria, for example, program content, program time availability, and the like. In another embodiment, multiple PPS's may be created utilizing the one or more criteria.

In one embodiment, the user accesses a service provider 170 utilizing a user interface 210, via a combination of one or more communication networks 150 and/or land networks 160, to create the PPS. In an example, the user may access the service provider 170 utilizing a personal computer via the Internet. In another example, the user may access the service provider 170 utilizing a personal data assistant 230. The user may then create and archive the PPS.

In one embodiment, available programs located at the service provider 170 include, among other information, data defining a starting time index and an ending time index, and referred to as personalized program selection time indices (PPSTI).

In one embodiment, the PPS may be archived at the user interface 210. In an example, the PPS may be archived in a storage device located within the interface 210. In another example, the PPS may be archived in mobile memory device 220. In yet another example, the PPS may be archived in a personal data assistant 230. The method then advances to block 330.

At block 330, the user transfers the archived PPS to audio device 115 located within a mobile vehicle communication unit (MVCU) 110. The user may transfer one or more PPS's. In one embodiment, a mobile memory device 220 may be utilized to transfer the PPS to audio device 115. In one example, the transfer may be completed via direct connection between mobile memory device 220 and audio device 115.

In another embodiment, a personal data assistant 230 may be utilized to transfer the PPS to audio device 115. In one example, the transfer may be completed via coupling personal data assistant 230 to audio device 115. In another example, the transfer may be completed via wireless communication between personal data assistant 230 and audio device 115. The method then advances to block 340.

At block 340, the user initiates audio device 115. Initiating audio device 115 allows the device to begin receiving a broadcast stream utilizing one or more radio broadcast systems 130 and satellite broadcast systems 140 as described above. The method then advances to block 350.

At block 350, audio device 115 requests and receives the PPS. In one embodiment, the PPS is a user provided PPS. In another embodiment, the PPS is a previously provided PPS. In yet another embodiment, the user may choose between one or more currently provided or previously provided PPS's. The method then advances to decision block 360.

At decision block 360, audio device 115 compares personalized program selection time indices (PPSTI) of user scheduled programs in the PPS to the current time index (CTI). If the CTI is within the PPSTI of a scheduled program in the PPS, the method advances to block 370. If the CTI is not within the PPSTI of a scheduled program in the PPS, the method advances to block 380.

At block 370, audio device 115 identifies the scheduled program from the PPS and receives the broadcast channel associated with the scheduled program. The method then returns to decision block 360. In one embodiment, the method will remain in a loop defined as decision block 360 and block 370 until the CTI no longer falls within the PPSTI of scheduled programs in the PPS.

At block 380, audio device 115 receives a user defined radio station preference setting. In one embodiment, audio device 115 maintains the current user defined broadcast station, as the current time index (CTI) does not fall within any PPSTI's of the PPS. In another embodiment, audio device 115 returns to a previous user defined broadcast station as the CTI no longer falls within any PPSTI's of the PPS. The method then advances to block 390 where it returns to user control.

Figure 4:
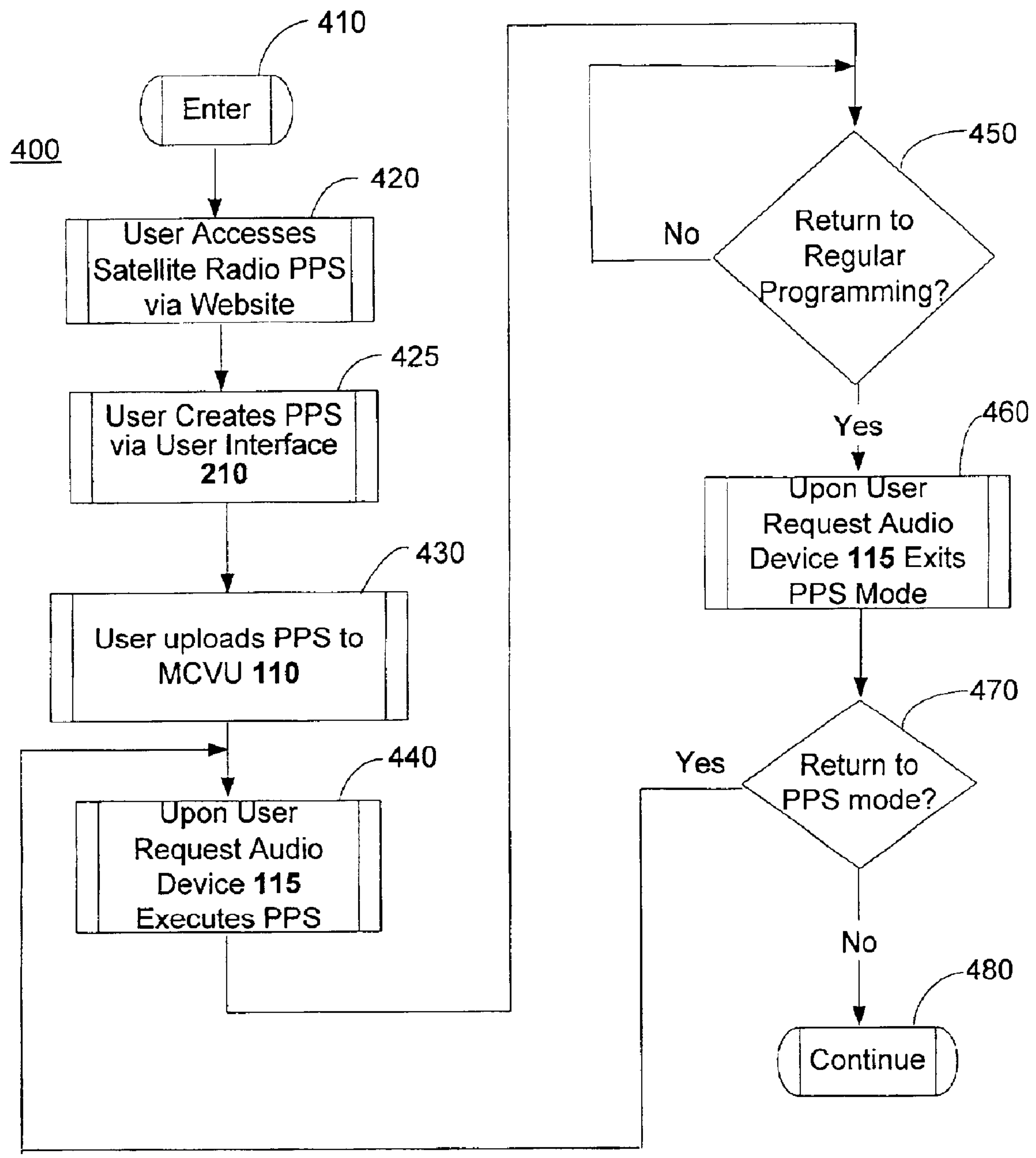
FIG. 4 is a block diagram depicting another exemplary embodiment of code on a computer readable medium in accordance with the present invention.

FIG. 4 is a block diagram depicting another exemplary embodiment of code, referred to as a program, on a computer readable medium in accordance with the present invention. FIG. 4 blocks function like similarly described FIG. 3 blocks. FIG. 4 details an embodiment of a method 400 for scheduling and receiving user preference satellite radio selections in a mobile vehicle, in accordance with the present invention. Method 400 may utilize one or more systems detailed in FIG. 1 and FIGS. 2 and 2*a* above.

Method 400 begins at block 410 where a user may determine a need to create and utilize a personal programming schedule (PPS). In one embodiment, the PPS may be implemented in a user preference satellite reception system (UPSRS) and referenced as a vehicle preference selection list (VPSL). Method 400 then advances to block 420.

At block 420, the user accesses a programming schedule via a website. In one embodiment, this may be accomplished as part of block 320 of FIG. 3. The method then advances to block 425. At block 425, the user creates a personal programming schedule (PPS). In one embodiment, this may be accomplished as in block 320 of FIG. 3. The method then advances to block 430.

At block 430, the user uploads the PPS to the vehicle. In one embodiment, this may be accomplished as in block 330 of FIG. 3. The method then advances to block 440. At block 440, audio device 115 executes the user's PPS upon the user request and enters a PPS mode. The user may deliver the instruction by several different methods including touch, verbal, and the like. In one embodiment, the audio device 115 may execute the user's instruction by performing blocks 340 thru 380 of FIG. 3. The method then advances to decision block 450.

At decision block 450, audio device 115 determines if the user requires the method to exit PPS mode and return to regular programming. If the user instructs the program to exit PPS mode, the method advances to block 460. If the user does not instruct the program to exit PPS mode, the method advances to decision block 450.

At block 460, audio device 115 receives instruction from the user and exits PPS mode, returning to regular programming. The user may deliver the instruction by several different methods including touch, verbal, and the like. The method then advances to decision block 470.

At decision block 470, audio device 115 determines if the user requires the method to reenter PPS mode or return to regular programming. If the user instructs the program to enter PPS mode, the method advances to block 440. If the user does not instruct the program to enter PPS mode, the method advances to block 480 and returns to regular programming.

The above-described methods and implementation for scheduling user preference satellite radio selections in a mobile vehicle are example methods and implementations. These methods and implementations illustrate one possible approach for scheduling user preference satellite radio selections in a mobile vehicle. The actual implementation may vary from the method discussed. Moreover, various other improvements and modifications to this invention may occur to those skilled in the art, and those improvements and modifications will fall within the scope of this invention as set forth in the claims below.

The present invention may be embodied in other specific forms without departing from its spirit or essential characteristics. The described embodiments are to be considered in all respects only as illustrative and not restrictive.

We claim:

1. A method for scheduling user preference satellite radio station selections in a mobile vehicle, the method comprising:

creating an at least one vehicle preference selection schedule utilizing a user interface;

transferring the vehicle preference selection schedule into a mobile communication unit, wherein transferring the vehicle preference selection schedule comprises communicating with a service provider;

monitoring a satellite radio system broadcast;

requesting the vehicle preference selection schedule from the mobile communication unit; and extracting a radio station selection from the broadcast based on the vehicle preference selection schedule.

2. The method of claim 1 wherein extracting the radio station selection comprises:

comparing user personalized program selection time indices in the vehicle preference selection schedule to a current time index; and selecting the radio station selection linked to a time index that matches the current time index.

3. The method of claim 1 further comprising:

switching between the vehicle preference selection schedule and a user defined radio station preference setting in response to user input.

4. The method of claim 1 wherein creating the at least one vehicle preference selection schedule utilizing the user interface comprises a user communicating with a provider of the broadcast over an internet connection.

5. The method of claim 1 wherein transferring the vehicle preference selection schedule comprises communicating with the service provider utilizing a wireless communication system.

6. The method of claim 1 wherein transferring the vehicle preference selection schedule comprises communicating with the service provider including the reception of the vehicle preference selection schedule utilizing a satellite broadcast system.

7. A system for vehicle preference selection monitoring comprising:

means for creating a vehicle preference selection schedule utilizing a user interface;

means for transferring the vehicle preference selection schedule into a mobile communication unit, wherein the means for transferring the vehicle preference selection schedule comprises means for communicating with a service provider;

means for monitoring a satellite radio system broadcast;

means for requesting the vehicle preference selection schedule from the mobile communication unit; and means for extracting a selection from the broadcast based on the vehicle preference selection schedule.

8. The system of claim 7 wherein means for extracting the selection comprises:

means for comparing user personalized program selection time indices in the vehicle preference selection schedule to a current time index; and means for selecting the selection time index that includes the current time index.

9. The system of claim 7 further comprising:

means for switching between the vehicle preference selection schedule and a user defined radio station preference setting in response to user input.

10. A computer readable medium storing a computer program comprising:

computer readable code for creating at least one vehicle preference selection schedule utilizing a user interface;

computer readable code for transferring the vehicle preference selection schedule into a mobile communication unit, wherein the computer readable code for transferring the vehicle preference selection schedule comprises computer readable code for communicating with a service provider;

computer readable code for monitoring a satellite radio system broadcast;

computer readable code for requesting the vehicle preference selection schedule from the mobile communication unit; and computer readable code for extracting a selection from the broadcast based on the vehicle preference selection schedule.

11. The computer readable medium of claim 10 wherein the computer readable code for extracting the selection comprises:

computer readable code for comparing user personalized program selection time indices in the vehicle preference selection schedule to a current time index; and computer readable code for selecting the selection time index that includes the current time index.

12. The computer readable medium of claim 10 further comprising:

computer readable code for switching between the vehicle preference selection schedule and a user defined radio station preference setting in response to user input.

13. The computer readable medium of claim 10 wherein the computer readable code for creating the at least one vehicle preference selection schedule utilizing the user interface comprises computer readable code for communicating with a provider of the broadcast over an internet connection.

14. The computer readable medium of claim 10 wherein the computer readable code for transferring the vehicle preference selection schedule comprises:

computer readable code for communicating with the service provider utilizing a wireless communication system.

15. The computer readable medium of claim 10 wherein the computer readable code for transferring the vehicle preference selection schedule comprises:

computer readable code for communicating with the service provider that includes computer readable code enabling the reception of the vehicle preference selection schedule utilizing a satellite broadcast system.

16. The method of claim 1, wherein creating the vehicle preference selection schedule comprises utilizing a wireless connection.

17. The method of claim 1, wherein creating the vehicle preference selection schedule comprises utilizing a physical memory device.

18. The method of claim 1, wherein the user interface is coupled to the mobile vehicle.

19. The computer readable medium of claim 10, wherein the computer readable code for creating the vehicle preference selection schedule comprises computer readable code for utilizing a wireless connection.

20. The computer readable medium of claim 10, wherein the computer readable code for creating the vehicle preference selection schedule comprises computer readable code for utilizing a physical memory device.

* * * * *